United States Patent Office 2,759,984
Patented Aug. 21, 1956

2,759,984

PRODUCTION OF ALKYL AROMATIC COMPOUNDS

Maurice J. Schlatter, El Cerrito, Calif., assignor to California Research Corporation, San Francisco, Calif., a corporation of Delaware No Drawing. Application December 18, 1950,
Serial No. 201,479

6 Claims. (Cl. 260—671)

This invention relates to a process for producing substituted aromatic compounds, more particularly to a process for producing alkyl aromatic compounds and cycloalkyl aromatic compounds.

In one specific embodiment of the invention a tertiary-butyl aromatic compound is contacted with an isoparaffin, or with an alkyl substituted cycloaliphatic hydrocarbon in the presence of an alkylation catalyst under alkylating conditions. Under these conditions the tertiary-butyl group is replaced by the isoparaffin or the cycloaliphatic hydrocarbon, as the case may be, to produce an alkyl aromatic compound or a cycloalkyl aromatic compound and isobutane.

In another embodiment of the invention an aromatic hydrocarbon is alkylated with a tertiary-butylating agent such as isobutane, tertiary-butyl alcohol, or tertiary-butyl chloride, to produce a tertiary-butyl aromatic compound. The tertiary-butyl aromatic group is then replaced on the aromatic nucleus with an alkyl group or a cycloalkyl group by contacting the tertiary-butyl aromatic compound with an isoparaffin or with a cycloparaffin of the character above described in the presence of an alkylation catalyst under alkylating conditions.

In a further specific embodiment of the invention an alkylatable aromatic compound, a tertiary-butylating agent, and an isoparaffin or cycloparaffin of the types above described, are contacted with an alkylation catalyst under alkylating conditions to form isobutane and an alkyl or cycloalkyl aromatic compound.

The above reactions are believed to proceed by a mechanism in which a proton is transferred from the isoparaffin or cycloparaffin to a tertiary-butyl carbonium ion forming isobutane and a new carbonium ion which combines with the aromatic nucleus, or by a concerted action in which these steps occur more or less simultaneously.

Isoparaffins which replace the tertiary-butyl group of a tertiary-butyl aromatic compound pursuant to the invention include isopentane, 2-methylpentane, 3-methylpentane, 2,3-dimethylbutane, 2-methylhexane, 3-methylhexane, 3-ethylpentane, 2-methylheptane, 3-methylheptane, 4-methylheptane, 3-ethylhexane, 2,3-dimethylhexane, 3,4-dimethylhexane, 2-methyl-3-ethylpentane, 2-methyloctane, 2,methylnonane, 4-methyldecane, and 2,6-dimethyldecane. Other isoparaffins containing at least one tertiary carbon atom are operative in the process.

Cycloparaffins which replace the tertiary-butyl group on the nucleus of a tertiary-butyl aromatic compound include methylcyclopentane, ethylcyclopentane, 1,2-dimethylcyclopentane, 1,3-dimethylcyclopentane, normal propylcyclopentane, methylcyclohexane, 1,3-dimethylcyclohexane, and 1,2,4-trimethylcyclohexane.

The aromatic compounds which are operative in the process of the invention are in general those which are alkylatable with isobutane. The aromatic compounds may be hydrocarbons such as benzene, toluene, the xylenes, naphthalene, and alkylnaphthalenes, or they may be aromatic compounds containing non-hydrocarbon substituents on the nucleus which do not seriously affect the alkylatability of the aromatic nucleus, for example, phenol, chlorobenzene, and bromobenzene may be alkylated with isobutene and the resultant tertiary-butyl aromatic compound may be reacted with an isoparaffin or a cycloparaffin pursuant to the invention to replace the tertiary-butyl group with an alkyl or cycloalkyl group.

Conventional alkylation catalysts are employed in the process of the invention, for example, sulfuric acid, hydrofluoric acid, Friedel-Crafts catalysts such as aluminum chloride, and HF–BF$_3$ are effective. The particular alkylation catalyst selected for use in the process is employed under conditions which are suitable for alkylating benzene with isobutene or other tertiary-butylating agent when using the particular catalyst.

The following examples illustrate the process of the invention:

*Example 1*

The following example illustrates the manner in which an isoparaffin atom replaces the tertiary-butyl group on an aromatic nucleus pursuant to the invention.

A mixture of 100 g. (0.617 mol) of 1,3-dimethyl-5-tertiary-butylbenzene and 222 g. (3.09 mols) of isopentane was cooled to 0° C. in a copper flask equipped with a stainless-steel stirrer and gas outlet-tube. Liquid hydrogen fluoride (164 g., 8.2 mols) was added and the mixture vigorously stirred for 6.5 hours while cooling in an ice bath. The contents of the flask were poured on crushed ice, the hydrofluoric acid was neutralized with excess potassium hydroxide and the organic phase separated, washed with 5 per cent aqueous sodium bicarbonate and dried over anhydrous magnesium sulfate. Isobutane and isopentane were removed by distillation using a short column and the residue was fractionated at 750–760 mm. pressure through a 75 cm. x 16 mm. column packed with 3/32 inch Pyrex glass helices. The following cuts were obtained:

| Cut No. | Temp., ° C., at Cut Point | Wt., g. | $n_D^{20}$ | $d_4^{20}$ |
|---|---|---|---|---|
| Start | 138.0 | | | |
| 1 | 200.6 | 4.3 | 1.4530 | |
| 2 | 206.6 | 3.8 | 1.4822 | |
| 3 | 207.2 | 8.6 | 1.4960 | |
| 4 | 207.8 | 8.4 | 1.4960 | |
| 5 | 220.4 | 8.4 | 1.4968 | |
| 6 | 224.7 | 7.2 | 1.4992 | |
| 7 | 224.8 | 9.0 | 1.4997 | |
| 8 | 224.8 | 18.4 | 1.4997 | 0.8739 |
| 9 | 225.4 | 8.9 | 1.4996 | |
| 10 | 225.4 | 4.5 | 1.4996 | |
| 11 [1] | 250.0 | 9.9 | 1.4987 | |
| Bottoms | | 1.0 | | |

[1] Cut 11 was obtained by fractional distillation of the bottoms from a small Claisen flask.

As determined from the distillation curve, the product from the reaction after removal of isobutane and isopentane had the following composition:

Percent by weight
A. Meta-xylene _____ 4.8
B. 1,3-dimethyl-5-tertiary-butylbenzene _____ 30.6
C. 1,3-dimethyl-5-tertiary-amylbenzene _____ 62.2
D. High-boiling products _____ 2.3

Absorption maxima at 9.6, 9.9, 11.75 and 14.15μ in the infrared spectrum of fraction C are characteristic of the 1,3,5-trialkylbenzenes. That the amyl group has the tertiary-amyl structure is shown by detailed comparison of the spectrum with that of other aromatic hydrocarbons having tertiary-alkyl groups. The split peak at 9.6–9.9μ, in particular, is characteristic of the tertiary-alkylbenzenes.

A sample of 1,3-dimethyl-5-tertiary-amylbenzene prepared by the hydrogen fluoride catalyzed alkylation of meta-xylene with tertiary-amyl chloride had the following properties:

Boiling point _____ 225.5° C. at 760 mm.
Refractive index, $n_D^{20}$ _____ 1.4997.
Density, $d_4^{20}$ _____ 0.8738.

The sample was purified by distillation through a 30 plate column and a series of plateau cuts taken. The properties above are those of center cut, constant boiling, constant refractive index cuts.

*Example 2*

This example illustrates the manner in which a cycloparaffin containing a tertiary-carbon atom replaces the tertiary-butyl group on an aromatic nucleus pursuant to the invention.

A mixture of 100 g. (0.617 mol) of 1,3-dimethyl-5-tertiary-butylbenzene and 160 g. (1.91 mols) of methylcyclopentane was cooled to 0° C. in a copper flask equipped with stainless-steel stirrer and gas outlet tube. Liquid hydrogen fluoride (185 g., 9.12 mols) was added and the mixture stirred vigorously for 6 hours while cooling in an ice bath. The contents of the flask were poured on crushed ice, the hydrofluoric acid neutralized with excess potassium hydroxide and the organic phase separated. The aqueous phase was extracted with 3–200 ml. portions of ether, the ether extracts were combined with the organic phase, and the mixture, followed by a portion of ether, passed through a column containing about 100 g. of super-filtrol clay. The ether, excess methylcyclopentane and isobutane were removed by distillation using a short column and the residue was fractionated under reduced pressure using a 75 cm. x 16 mm. column packed with 3/32 inch Pyrex glass helices.

The product had the following composition:

| Product | Boiling Range, °C., at 100 mm. | Amt., g. | Wt. Percent of Product |
|---|---|---|---|
| A. Meta-xylene | Degrees 75–77 | 16.2 | 13.9 |
| B. Intermediate fraction | 130–155 | 17.0 | 14.6 |
| C. Dimethyl-C₆H₁₁-benzene | 182–184 | 70.7 | 60.7 |
| D. Bottoms | | 12.6 | 10.8 |

The amount of product boiling between the cuts indicated above was negligible. The intermediate fraction B contains unreacted 1,3-dimethyl-5-tertiary-butylbenzene and at least one other major component.

1,3-dimethyl-5-tertiary-methylcyclopentylbenzene (38.2 g.) crystallized from Fraction C on cooling to 0° C. An additional 4.6 g. was obtained by re-working the filtrate remaining after removing the crystals. The product was obtained as colorless needles by recrystallization from a mixture of ethanol and benzene, M. P. 46.6–47.0° C.; Anal.: C, 89.21%; H, 10.70% (calculated for C₁₄H₂₀: C, 89.29%; H, 10.71%). The 1,3,5-configuration was established spectrometrically and structure confirmed by establishing identity with an authentic sample of 1,3-dimethyl-5-tertiary-methylcyclopentylbenzene prepared by the hydrogen fluoride catalyzed alkylation of meta-xylene with 1-methyl-1-chlorocyclopentane.

*Example 3*

A mixture of 100 g. (0.745 mol) of tertiary-butylbenzene, 313 g. (3.73 mols) of methylcyclopentane and 171 g. (8.55 mols) of liquid hydrogen fluoride was reacted for 6.25 hours at 0° C. and the reaction product worked up essentially as described in Example 1. After removal of methylcyclopentane, the product was found to have the following composition by distillation:

Percent by weight
A. Tertiary-butylbenzene _____ 42.1
B. C₆H₁₁-benzene _____ 31.5
C. High boiling products _____ 26.4

The C₆H₁₁-benzene Fraction (B) was fractionated through a 50 plate semi-micro concentric-tube column at 100 mm. pressure. The following fractions were obtained:

| Cut | Temp., °C., at 100 mm. at Cut Point | Wt., g. | $n_D^{20}$ | CH Anal. (Calc'd. for C₁₂H₁₆: C, 89.93; H, 10.07) |
|---|---|---|---|---|
| Start | 152.2 | 1.0 | 1.5063 | |
| 2 | 152.8 | 0.7 | 1.5148 | |
| 3 | 153.2 | 4.7 | 1.5153 | C, 89.51; H, 10.46 |
| 4 | 153.3 | 3.3 | 1.5147 | |
| 5 | 153.3 | 3.2 | 1.5160 | |
| 6 | 153.6 | 4.8 | 1.5180 | |
| 7 | 153.9 | 2.3 | 1.5189 | |
| 8 | 154.6 | 2.0 | 1.5189 | C, 89.90; H, 10.15 |
| 9 | 154.8 | 0.7 | 1.5187 | |
| 10 | 155.0 | | | |

A very similar product was obtained, showing the same boiling range and trend in refractive indices, when benzene was alkylated with 1-methyl-1-chlorocyclopentane catalyzed by hydrogen fluoride at 0° C. Both products were shown spectrometrically to contain a major proportion of tertiary-methylcyclopentylbenzene, very little—if any—cyclohexylbenzene, and small amounts of 1,3- and 1,4-disubstituted benzenes.

The fraction boiling above 155° C. at 100 mm. pressure consists mainly of 1,4- and 1,3-dialkylbenzenes in a ratio of approximately 3 to 1. 1,4-di-tertiary-butylbenzene and a new compound, para-tertiary-methylcyclopentyl-tertiary-butylbenzene, M. P. 72.0–72.5° C.; Anal. C, 88.75; H, 11.14 (calculated for C₁₆H₂₄ C., 88.82; H, 11.18) were isolated from the mixture.

*Example 4*

A mixture of 212 g. (2.0 mols) of 96.5% meta-xylene, 721 g. (8.36 mols) of 98% methylcyclopentane and 180 g. (9.0 mols) of liquid anhydrous hydrogen fluoride was stirred vigorously in a copper flask immersed in an ice bath. Two mols of 99% isobutene was passed into the mixture over a period of 90 minutes and stirring and cooling continued for another four hours. The reaction mixture was then poured on crushed ice and the acid neutralized with excess potassium hydroxide. The organic phase was separated (965 g.), dried over calcium chloride and fractionally distilled through a 75 cm. x 16 mm. column packed with 3/32 inch Pyrex helices.

The constituents of the reaction product, estimated from the distillation curve, are:

| Fraction | Composition | Weight, g. | Wt. Percent of Fractions B to G |
|---|---|---|---|
| A | Methylcyclopentane | 569.9 | |
| B | m-xylene | 46.6 | 12.3 |
| C | Intermediate fraction | 16.0 | 4.2 |
| D | 1,3-dimethyl-5-tertiary-butylbenzene | 85.5 | 22.5 |
| E | Intermediate fraction | 16.8 | 4.4 |
| F | C₆H₁₁-meta-xylene | 192.4 | 50.6 |
| G | High boiling products | 22.6 | 6.0 |
| | | 949.8 | 100.0 |

Fraction F yielded 122.6 g. of crystalline product melting at 46.5–47.0° C. when the cuts distilling from 180.0–186.6° C. at 100 mm. pressure (170.3 g.) were combined, diluted with two volumes of absolute ethanol, cooled in Dry Ice, filtered and washed with cold absolute ethanol. The product was shown to be identical with that obtained in Example 2 and therefore is 1,3-dimethyl-5-tertiary-methylcyclopentylbenzene.

The foregoing examples are provided to illustrate the process of the invention in its several embodiments and to demonstrate the manner in which isoparaffins and alkyl cycloparaffins will replace the tertiary-butyl group on an aromatic nucleus.

I claim:

1. The method of producing substituted benzenes by replacing the tertiary-butyl group of a tertiary butylbenzene with another saturated aliphatic substituent which comprises intimately contacting a tertiary butylbenzene with a hydrocarbon selected from the group consisting of isoparaffins other than isobutane and cycloparaffins containing at least one tertiary-carbon atom in the presence of a liquid acid alkylation catalyst under alkylating conditions and recovering from the reaction product mixture isobutane and a substantial fraction rich in benzene alkylated with said selected material.

2. A process for producing cycloalkyl aromatic compounds which comprises intimately contacting a tertiary butyl aromatic compound with a cycloparaffin containing at least one tertiary carbon atom in the presence of a liquid acid alkylation catalyst under alkylating conditions and recovering isobutane and a cycloalkyl aromatic compound from the reaction product.

3. The process as defined in claim 2, wherein the alkylation catalyst is HF and the tertiary butyl aromatic compound is a hydrocarbon.

4. A process for producing alkyl aromatic compounds having at least 5 carbon atoms in the alkyl group which comprises intimately contacting a tertiary butyl aromatic compound with an isoparaffin containing at least 5 carbon atoms in the presence of a liquid acid alkylation catalyst under alkylating conditions and recovering from the reaction product isobutane and a substantial fraction consisting predominantly of an alkyl aromatic compound having at least 5 carbon atoms in the alkyl group from the reaction product.

5. The process as defined in claim 4, wherein the alkylation catalyst is HF and the tertiary butyl aromatic compound is a hydrocarbon.

6. A process which comprises reacting a tertiary butyl benzene hydrocarbon with a hydrocarbon selected from the group consisting of isoparaffins containing at least 5 carbon atoms and alkyl substituted alicyclic hydrocarbons in the presence of a liquid acid alkylation catalyst under alkylating conditions and fractionally distilling the reaction product to separate isobutane and a substantial fraction consisting predominantly of a benzene hydrocarbon having said selected material as a nuclear substituent.

References Cited in the file of this patent
UNITED STATES PATENTS

| | | |
|---|---|---|
| 2,250,118 | Smithuysen | July 22, 1941 |
| 2,338,711 | D'Ouville et al. | Jan. 11, 1944 |
| 2,357,978 | Schmerling et al. | Sept. 12, 1944 |
| 2,361,355 | Sachanen et al. | Oct. 24, 1944 |
| 2,372,505 | Linn | Mar. 27, 1945 |
| 2,419,692 | Shoemaker et al. | Apr. 29, 1947 |
| 2,436,698 | Oblad | Feb. 24, 1948 |
| 2,514,419 | Schulze et al. | July 11, 1950 |
| 2,526,896 | Ipatieff et al. | Oct. 24, 1950 |
| 2,578,597 | Robinson | Dec. 11, 1951 |
| 2,626,966 | Kennedy et al. | Jan. 27, 1953 |
| 2,653,980 | Condon | Sept. 29, 1953 |

OTHER REFERENCES

Condon et al.: Jour. Amer. Chem. Soc., vol. 70 (July 1948), pages 2539–2542 (4 pages).